United States Patent [19]
Yamada et al.

[11] Patent Number: 5,842,781
[45] Date of Patent: Dec. 1, 1998

[54] VEHICULAR LAMPS AND METHOD OF MOLDING A LAMP BODY OF VEHICULAR LAMPS

[75] Inventors: Kunihiko Yamada; Osamu Sato; Tamotsu Kenjo; Hiroshige Shinkai, all of Shizuoka, Japan

[73] Assignee: Koito Manufacturing Co., Ltd., Tokyo, Japan

[21] Appl. No.: 698,665

[22] Filed: Aug. 16, 1996

[30] Foreign Application Priority Data

Aug. 21, 1995 [JP] Japan .................................. 7-233214

[51] Int. Cl.[6] ...................................... B29D 11/00
[52] U.S. Cl. ........................... 362/519; 362/548; 362/226
[58] Field of Search .............................. 264/259; 362/61, 362/80, 267, 509, 516, 519, 546, 548

[56] References Cited

U.S. PATENT DOCUMENTS

| | | | |
|---|---|---|---|
| 4,670,199 | 6/1987 | Montet et al. | 264/1.9 |
| 5,413,743 | 5/1995 | Prophet | 264/1.7 |

*Primary Examiner*—Thomas M. Sember
*Attorney, Agent, or Firm*—Koda & Androlia

[57] ABSTRACT

A vehicular lamp including a lamp body formed from a synthetic resin, a front lens coupled to a front opening of the lamp body, and a light source, wherein the lamp body is provided with a bulb holder part for holding the light source bulb, and a cover section of the bulb holder part is molded integrally with an outer peripheral part of the lamp body by different materials from each other.

22 Claims, 11 Drawing Sheets

VEHICULAR LAMPS AND METHOD OF MOLDING A LAMP BODY OF VEHICULAR LAMPS

BACKGROUND OF THE INVENTION

1. Field of the Invention

The present invention relates to a vehicular lamp and method of molding a lamp body of the vehicular lamp. More particularly, the invention relates to a novel vehicular lamp and a method of molding a lamp body of the vehicular lamp simple in structure and capable of reducing the number of required components and reducing manufacturing cost.

2. Field of the Invention

The conventional vehicular lamp includes a lamp body, a front lens coupled to a front opening of the lamp body to define a lamp chamber, a lamp bulb serving as a light source, and a bulb holder, i.e., a socket, detachably mounted to the lamp body for holding the lamp bulb to be disposed within the lamp chamber, and the lamp body and the lamp holder have been formed separately from each other.

According to the conventional vehicular lamp, since the lamp has a structure in which the lamp body and the bulb holder are separately formed from each other and the bulb holder is mounted to the lamp body, both the lamp body and the bulb holder are required to have complicated structures to mount to each other. Therefore, the molding apparatus must have been complicated in structure which deteriorates the yield rate during the molding and, as a result, the manufacturing cost has been high.

Further, since the lamp body and the bulb holder are separately formed from each other, a packing member must have been required to be fitted between the lamp body and the bulb holder to accomplish the water-proof property. The packing member also raises the manufacturing cost of the lamp.

In order to eliminate the foregoing problems, it is proposed that a bulb holder section is formed integrally with a lamp body. However, the bulb holder section must have a high heat resistivity because the temperature of the portion surrounding the light source bulb and a terminal section of which is very high while the light source bulb is turned on. For the reason, the entire lamp body must have been formed by a synthetic resin which has a high heat resistivity, which still raises the manufacturing cost.

SUMMARY OF THE INVENTION

The present invention was made in view of the foregoing problems accompanying the conventional and proposed vehicular lamp. Therefore, it is an object of the present invention to provide a vehicular lamp and method of molding a lamp body of the vehicular lamp simple in structure and capable of reducing the number of required components and reducing manufacturing cost.

The above and other objects can be achieved by a provision of a vehicular lamp which, according to the present invention, includes a lamp body formed from a synthetic resin, a front lens coupled to a front opening of the lamp body, and a light source, wherein the lamp body is provided with a bulb holder part for holding the light source bulb, and a cover section of the bulb holder part is molded integrally with an outer peripheral part of the lamp body by different materials from each other.

According to a method of molding a lamp body of the vehicular lamp of the present invention in which the vehicular lamp is molded by a synthetic resin integrally with a cover section of a bulb holder part for holding a light source bulb, a pre-molded bulb holder part having the cover section is inserted in a mold die, and then a resin material is injected into the mold die for molding an outer peripheral part of the lamp body, so that the cover section of the bulb holder part and the outer peripheral part of the lamp body are integrally formed.

According to the present invention, since the bulb holder part is molded integrally with the lamp body, the number of required components can be reduced, the structure can be simplified, no packing member is required and, therefore, the manufacturing cost can be lowered.

Further, because the cover section of the bulb holder part and the outer peripheral part of the lamp body are formed from the different materials from each other, only the cover section of the bulb holder part is formed by a material having a high heat resistivity. Therefore, this also contributes to suppress the manufacturing cost.

DESCRIPTION OF THE PREFERRED EMBODIMENTS

The vehicular lamp and method of molding a lamp body of the vehicular lamp according to the present invention will now be described hereinbelow in detail with reference to accompanying drawings.

Figure 1:
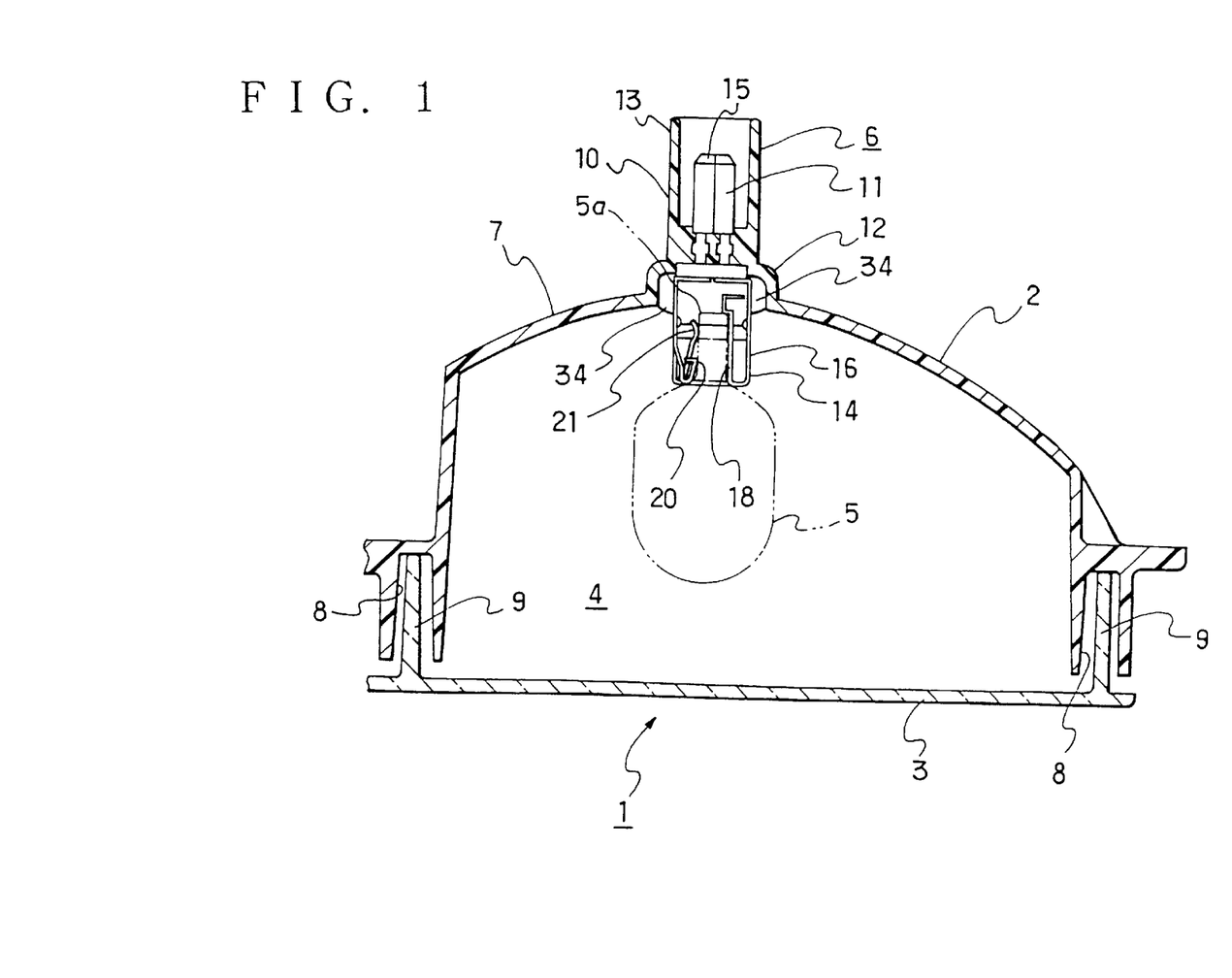
FIG. 1 is a horizontal sectional view showing a vehicular lamp according to one embodiment of the present invention.
Figure 2:
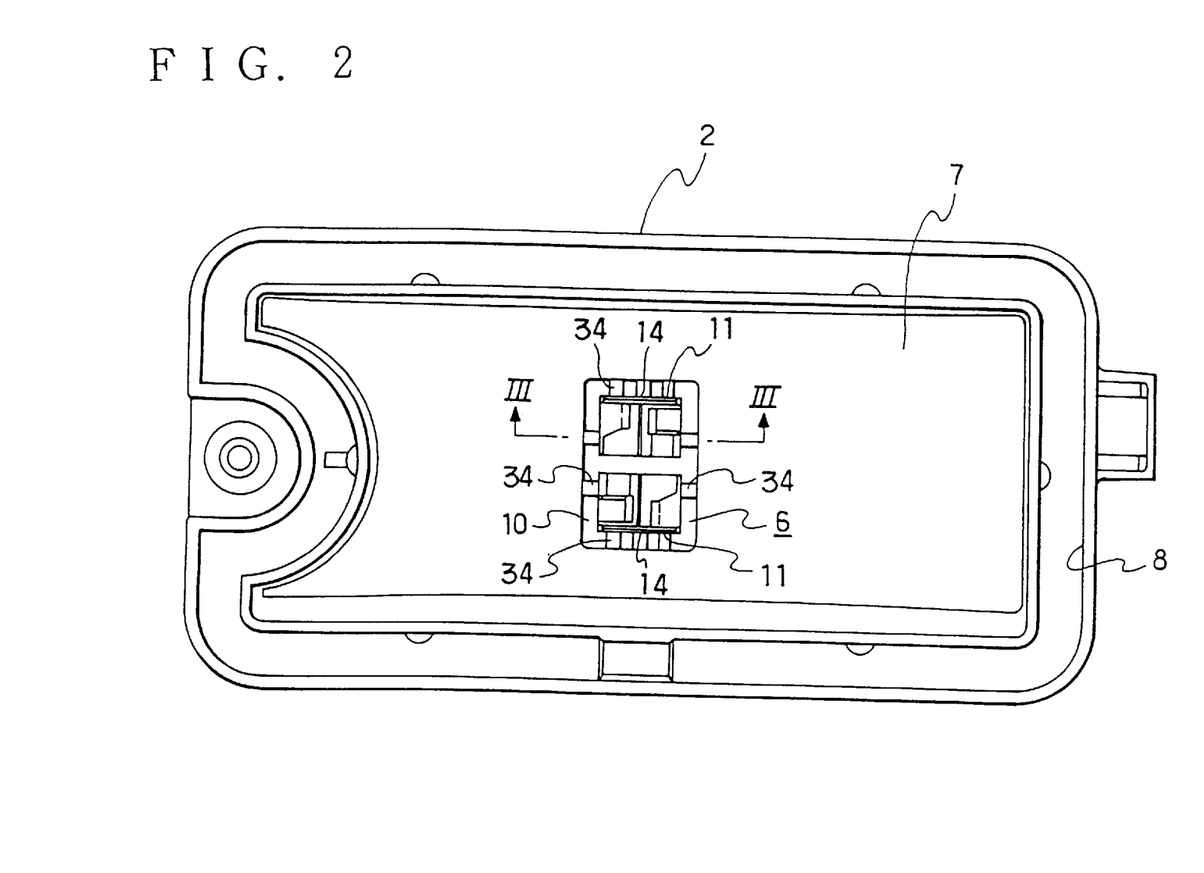
FIG. 2 is a front view of the vehicular lamp shown in FIG. 1 from which a lens member and a light source bulb are detached.
Figure 3:
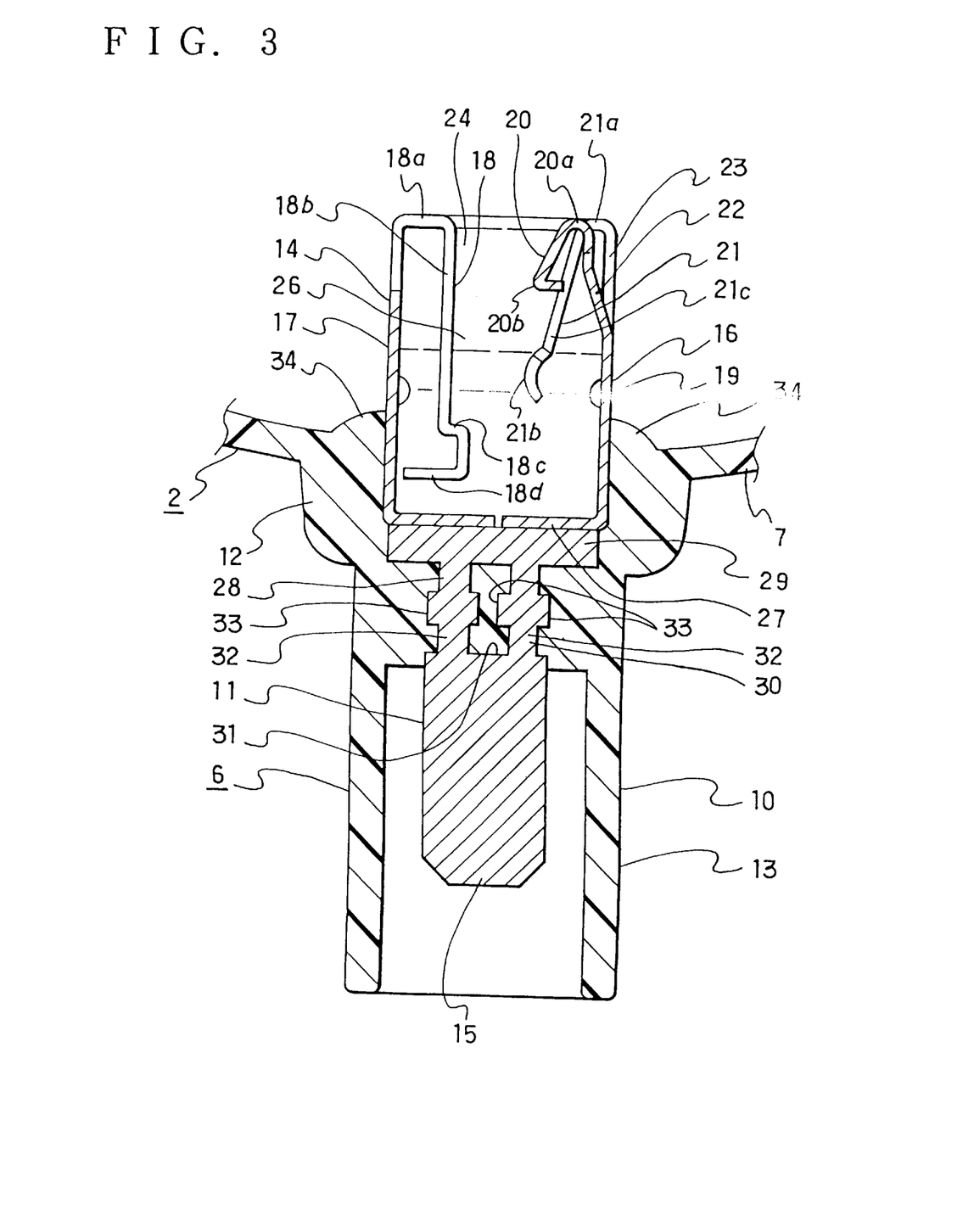
FIG. 3 is an enlarged sectional view cut along a line III—III in FIG. 2.
Figure 4:
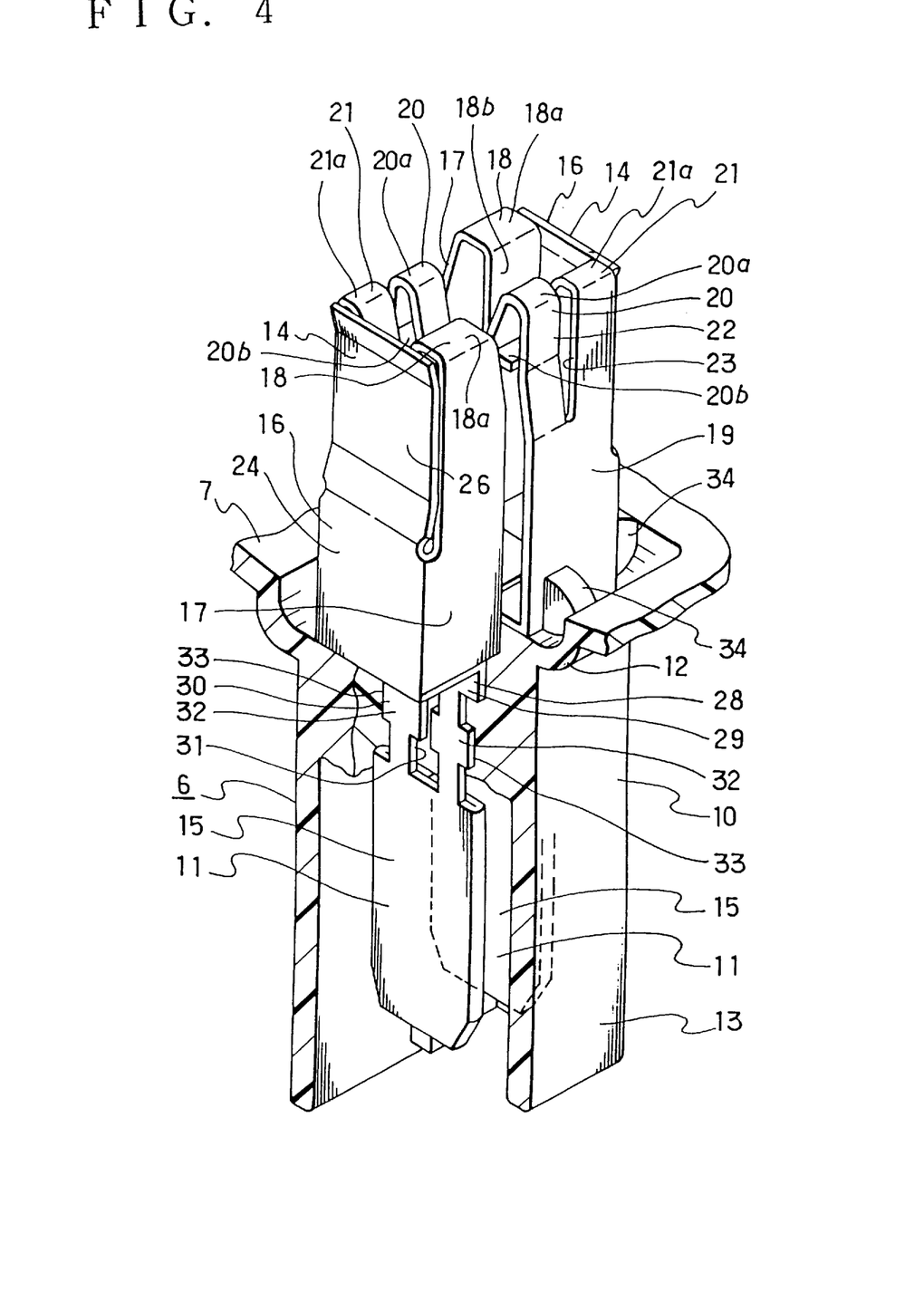
FIG. 4 is an enlarged perspective view showing a bulb holder part which is partly cut-out.
Figure 5:
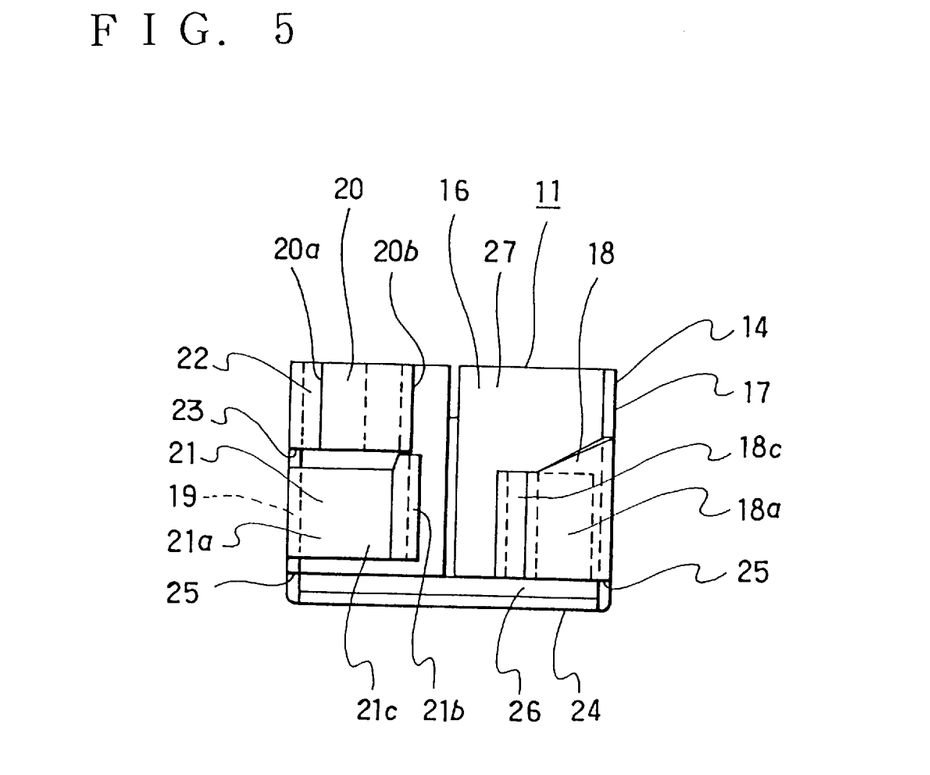
FIG. 5 is an enlarged front view of a terminal piece according to the embodiment of the invention shown in FIG. 1.
Figure 6:
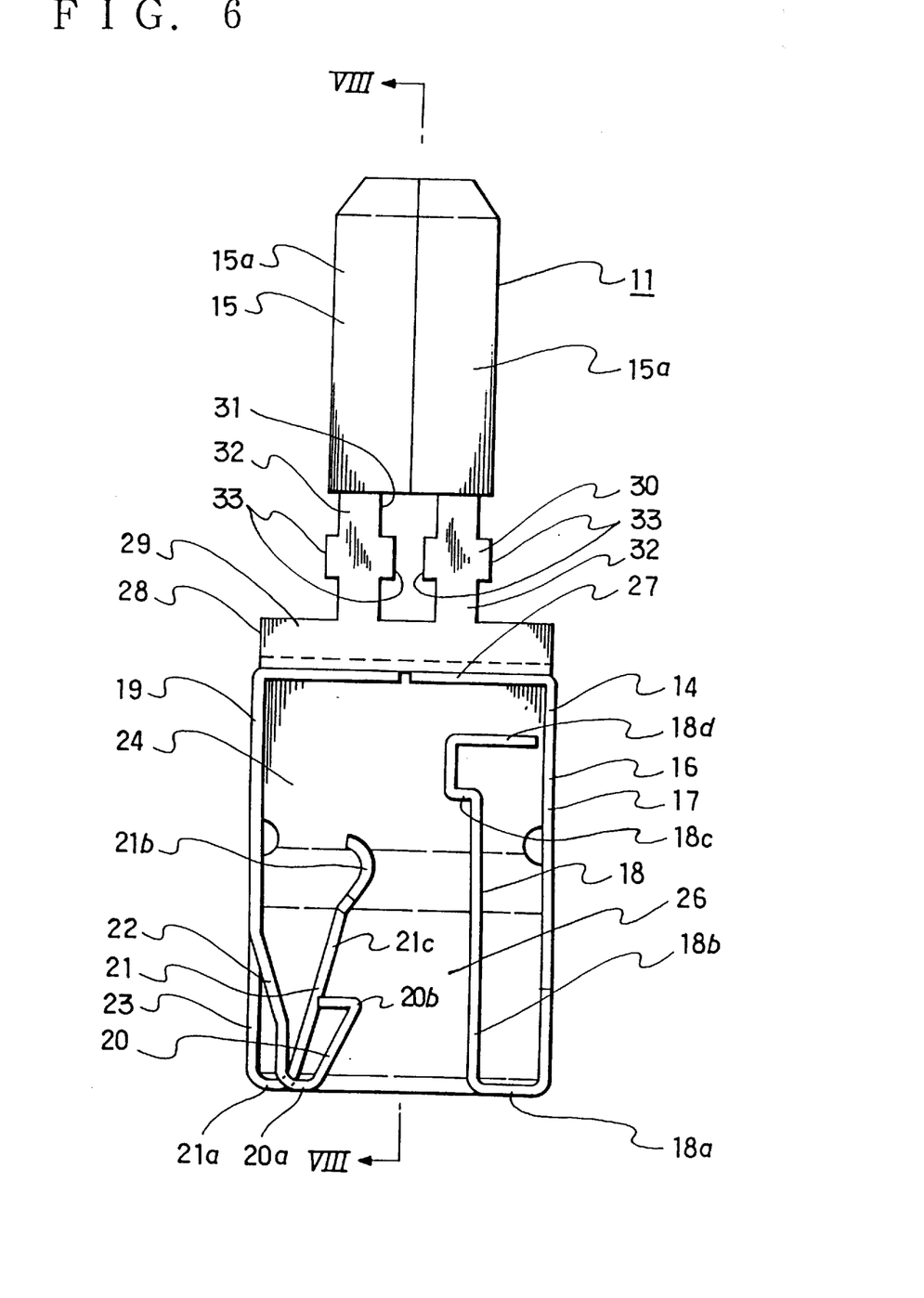
FIG. 6 an enlarged plan view of the terminal piece shown in FIG. 5.
Figure 7:
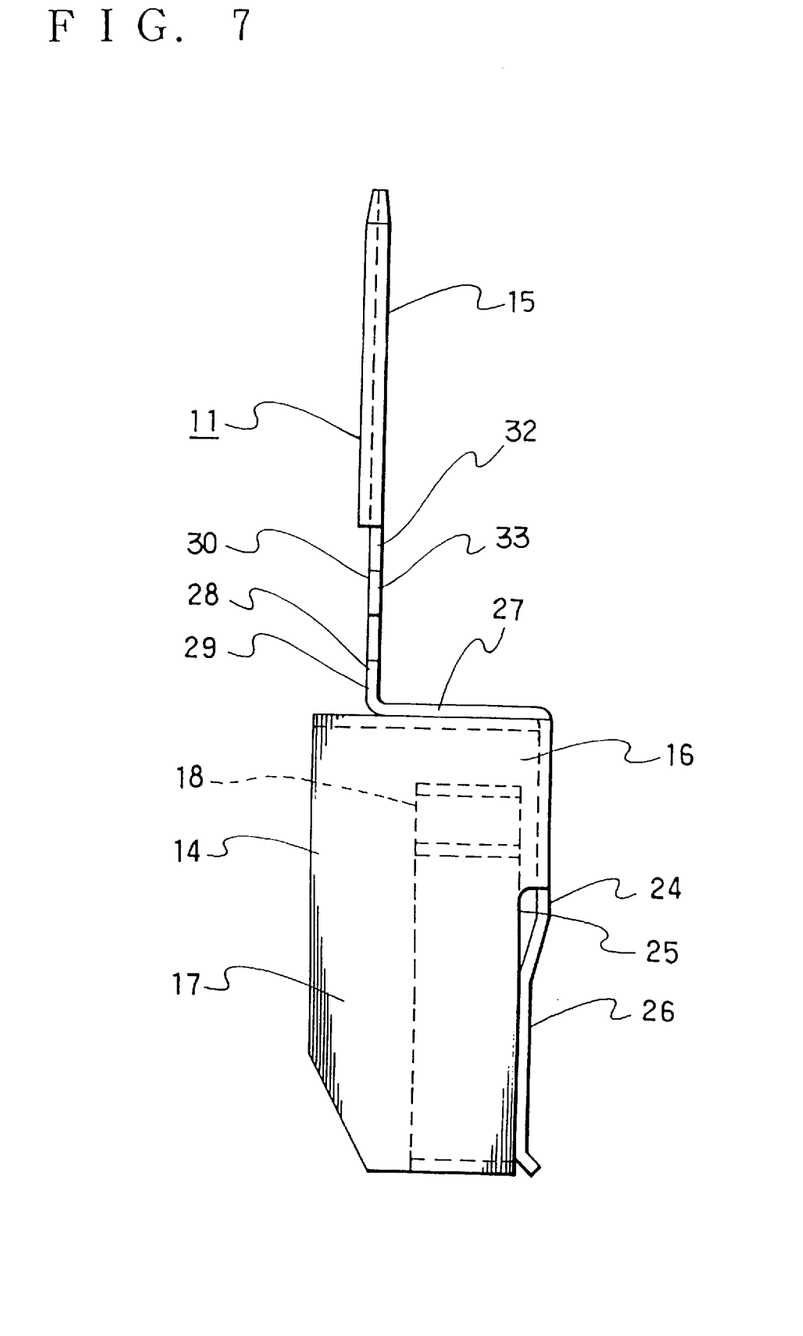
FIG. 7 is an enlarged right-side view of the terminal piece shown in FIG. 5.
Figure 8:
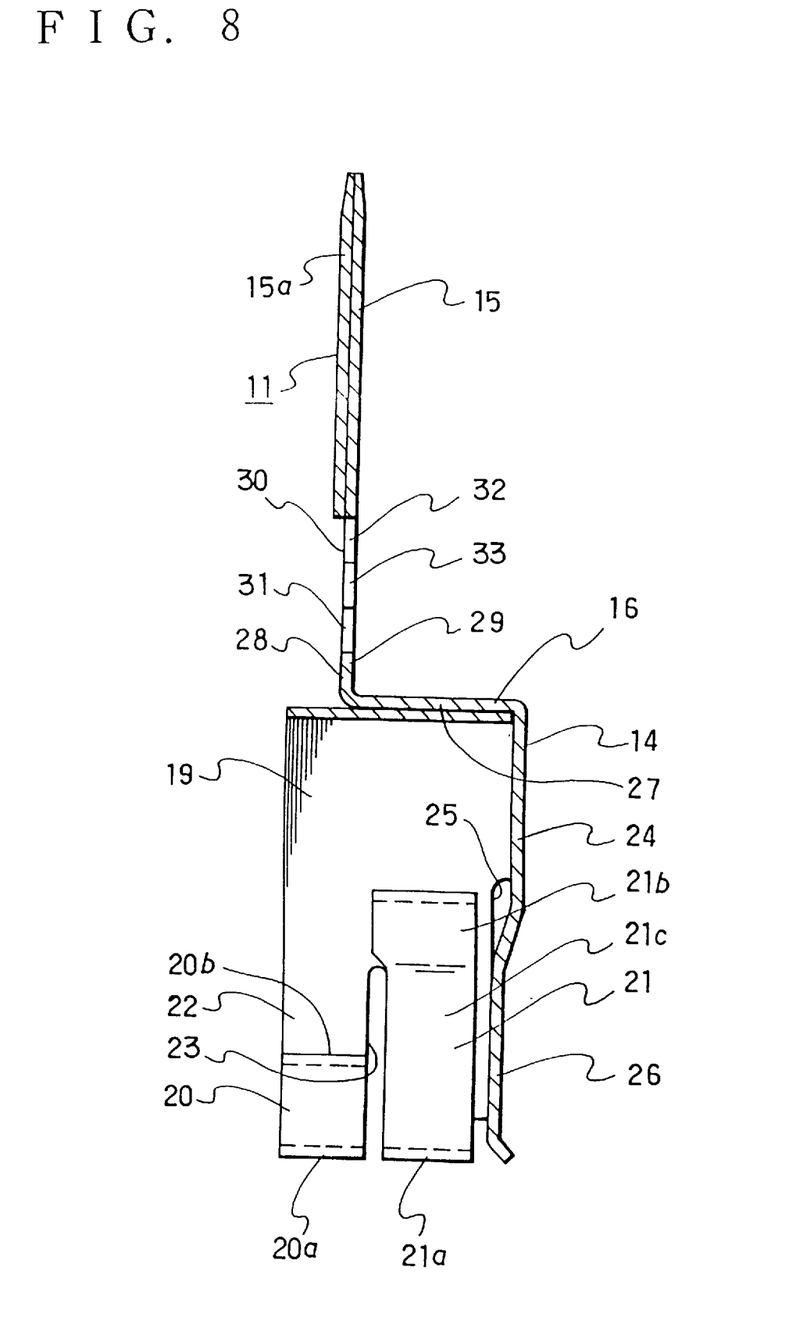
FIG. 8 is a sectional view of the terminal piece cut along a line VIII—VIII in FIG. 6.

FIGS. 1 through 8 show a vehicular lamp according to one embodiment of the present invention. More specifically, FIG. 1 is a horizontal sectional view showing a vehicular lamp according to one embodiment of the present invention, FIG. 2 is a front view of the vehicular lamp shown in FIG. 1 from which a lens member and a light source bulb are detached, FIG. 3 is an enlarged sectional view cut along a line III—III in FIG. 2, FIG. 4 is an enlarged perspective view showing a bulb holder part which is partly cut-out, FIG. 5 is an enlarged front view of a terminal piece according to the embodiment of the invention shown in FIG. 1, FIG. 6 an enlarged plan view of the terminal piece shown in FIG. 5, FIG. 7 is an enlarged right-side view of the terminal piece shown in FIG. 5, and FIG. 8 is a sectional view of the terminal piece cut along a line VIII—VIII in FIG. 6.

A vehicular lamp, that is an automotive signal lamp 1, for example, is constituted by a lamp body 2 formed from a synthetic resin, a front lens 3 covering a front opening of the lamp body 2, and a light source bulb 5 disposed within a lamp chamber 4 defined by the lamp body 2 and the front lens 3.

The lamp body 2 is formed integrally with a bulb holder part 6 and a part thereof except for the bulb holder part 6, i.e., an outer peripheral part 7 by molding synthetic resins. The bulb holder part 6 performs to support the light source bulb 5 and to electrically connect to the external devices not shown.

The outer peripheral part 7 is formed at an opening periphery thereof a mounting groove 8 opening frontward in the illuminating direction of light beams. On the other hand, the front lens 3 is provided with a mounting leg 9 projecting rearward from a peripheral edge part thereof. The mounting leg 9 of the front lens 3 is fitted in the mounting groove 8 of the outer peripheral part 7 of the lamp body 2 so that the front lens 3 is coupled to the lamp body 2.

The bulb holder part 6 of the lamp body 2 is constituted by a cover section 10 and terminal pieces 11.

The cover section 10 is integrally constituted by a base part 12 shaped like a shallow dish recessed forwardly and a connector casing part 13 projecting rearward from a rear end of the base part 12. The casing part 13 is square cylindrical and a rear end of the casing part 13 opens rearward.

The terminal pieces 11 have the same configuration as each other which are disposed in such a manner that the pieces are symmetrical vertically and laterally. Therefore, merely one of the terminal piece 11 will be described hereinbelow.

As shown in FIGS. 3 and 4, the terminal piece 11 is formed integrally with a bulb holding section 14 for holding the light source bulb 5 and a terminal section 15 for electrically connecting to the external electric device by a metal plate having an electrical conductivity and a spring resiliency.

As shown in FIGS. 3, 4 and 6, a base part 16 of the bulb holding section 14 is box-shaped opening upward (downward in case of the upper one), a front end of which opens while a rear end of which is closed except for an upper end part (lower end part in case of the upper one) thereof. A right side wall 17 (left side wall in case of the upper one) is continuously formed with a pressing piece 18 at a front end thereof whereas a left side wall 19 (right side wall in case of the upper one) is continuously formed with an engaging piece 20 and a contact piece 21 at a front end thereof.

The pressing piece 18 is formed integrally with a front end part 18a extending leftward (rightward in case of the upper one) from the front end of the right side wall 17, a restricting part 18b extending rearward from the left end (right end in case of the upper one) of the front end part 18a, the length of the restricting part 18b is substantially two-third of the base part 16, a stopper part 18c protruding slightly leftward (rightward in case of the upper one) from the rear end of the restricting part 18b, and a position-fixing part 18d extending slightly rearward from the left end (right end in case of the upper one) of the stopper section 18c, bending perpendicular to extend rightward (leftward in case of the upper one) and contacting a tip end thereof with a right side wall (left side wall in case of the upper one).

The front end part 18a extends leftward from a part of the right side wall 17 except for the lower end part (upper end part in case of the upper one) and the upper (lower in case of the upper one) one-third part thereof, and an upper edge (lower edge in case of the upper one) is gradually bent downward (upward in case of the upper one), so that a vertical width of which is substantially less than a half of a vertical width of the right side wall 17 at a left end (right end in case of the upper one) thereof. Vertical widths of the other parts 18b, 18c and 18d than the front end part 18a of the pressing piece 18 is substantially the same as the vertical width of the front end part 18a at the left end thereof, and they are located to face substantially the lower half of the right side wall 17.

The engaging piece 20 is formed of substantially the upper half portion (lower half in case of the upper one) of the left side wall 19 (right side wall in case of the upper one) of the base part 16. That is, a front side part 22 of the substantially the upper half portion of the left side wall 19 is separated by a slit 23 from the lower half portion (upper half portion in case of the upper one) at substantially a center position in the front-rear direction thereof. The engaging piece 20 extends slightly rightward from substantially the center position of the front side part 22 and then bent to extend straight frontward.

As best shown in FIGS. 3, 4 and 6, the engaging piece 20 is formed integrally with a front end part 20a extending rightward (leftward in case of the upper one) from the front end of the front side part 22 and then curving rearward, and an engaging part 20b extending slightly right-rearward (left-rearward in case of the upper one) from the right end (left end in case of the upper one) from the front end part 20a. A rear end part of the engaging part 20b is sharply bent leftward (rightward in case of the upper one).

The contact piece 21 is formed integrally with a front end part 21a extending rightward (leftward in case of the upper one) from the lower half portion (upper half portion in case of the upper one) of the left side wall 19 (right side wall in case of the upper one) of the base part 16 and then bending rearward, and a resilient part 21c extending slightly right-rearward (left-rearward in case of the upper one) from the right end (left end in case of the upper one) of the front end part 21a. A rear end part of the resilient part 21c is curved rightward (leftward in case of the upper one) to perform as a contact part 21b.

As best shown in FIG. 6, the contact part 21b of the contact piece 21 is disposed at a position slightly in front of the stopper part 18c of the pressing piece 18. The engaging part 20b of the engaging piece 20 is disposed at a right position (left position in case of the upper one) from a position of the resilient part 21c of the contact piece 21 in the front-rear direction. On the other hand, a part of the right-most end (leftmost end in case of the upper one) of the rear end of the engaging part 20b is disposed at a slightly left position (right position in case of the upper one) of the right end (left end in case of the upper one) of the contact part 21b of the contact piece 21.

As shown in FIGS. 7 and 8, a lower wall (upper wall in case of the upper one) 24 of the base part 16 includes a front part separated by slits 25 from the left and right side walls 17, 19 at slightly a rear position of the center in the front-rear direction thereof. The separated portion 26 projects upward (downward in case of the upper one) to act as an elastic piece.

An embedded part 28 projects rearward from an upper edge (lower edge in case of the upper one) of a rear wall 27 of the base part 16. The terminal section 15 extends rearward from a rear end of the embedded part 28.

The embedded part 28 has a lateral width which is equal to that of the rear wall 27. The embedded part 28 is constituted by a base part 29 which is a plate-like member having a small vertical width and an anchor part 30 projecting rearward from the center of the base part 29. The anchor part 30 has a lateral width which is substantially a half of the base part 29. The anchor part 30 is divided into a couple of elements 32 by a hole 31 formed in the center thereof, and each of the divided elements 32 is formed with a couple of protrusions 33 protruding therefrom in the left and right directions thereof.

The terminal section 15 is formed by cutting out a metal plate having a width of substantially twice as wide as the terminal section and folding a left and right pieces 15a over an upper surface (lower surface in case of the upper one), so that a thickness of the terminal section 15 is twice as thick as the row metal plate.

The terminal pieces 11 is integrally molded with the cover section 10 in such a manner that the embedded parts 28 of the terminal pieces 11 are embedded in the base part 12 of the cover section 10 under a condition where the openings of the base parts 16 of the bulb holding sections 14 face each other, and the bulb holding sections 14 protrude frontward from the front surface of the base part 12 while the terminal sections 15 are disposed within the connector casing part 13.

As best shown in FIGS. 3 and 4, a plurality of rib members 34 project from the front surface of the base part 12 of the cover section 10, and the rib members 34 contact to both outer surfaces of the upper wall 24 and outer surfaces of the outer and side walls 17, 19 of the lower wall 24 of the bulb holding sections 14 of the terminal pieces 11, thereby to contribute to stabilize the bulb holding sections 14.

During the assembly, as shown in FIG. 1, a base part 5a of the light source bulb 5 of the wedge-base type is inserted in the bulb holding sections 14 of the terminal pieces 11 from the front thereof. The vertical position of the light source bulb 5, the base part 5a of which is inserted in the bulb holding sections 14, is restricted by resiliently contacting the upper and lower side surfaces of the base part 5a with the elastic pieces 26 of the terminal pieces 11. On the other hand, the side surface of the base part 5a comes into abutment against the restricting parts 18b of the pressing pieces 18 of the terminal pieces 11 to thereby restrict the lateral position of the light source bulb 5. Further, a rear end of the base part 5a comes into abutment against the stopper parts 18c of the pressing pieces 18 so that a rear end position of the light source bulb 5 is restricted. Furthermore, engaging protrusion not shown in the figures formed on the base part 5a engages with the engaging parts 20b of the engaging pieces 20 so that the light source bulb 5 is prevented from detaching frontward. The contact parts 21b of the contact pieces 21 of the light source bulb 5 contact elastically with an external lead wires (not shown in the figures) disposed along the side surface of the base part 5a.

The lamp body 2 constructed as described above is molded by the following method.

Figure 9A:
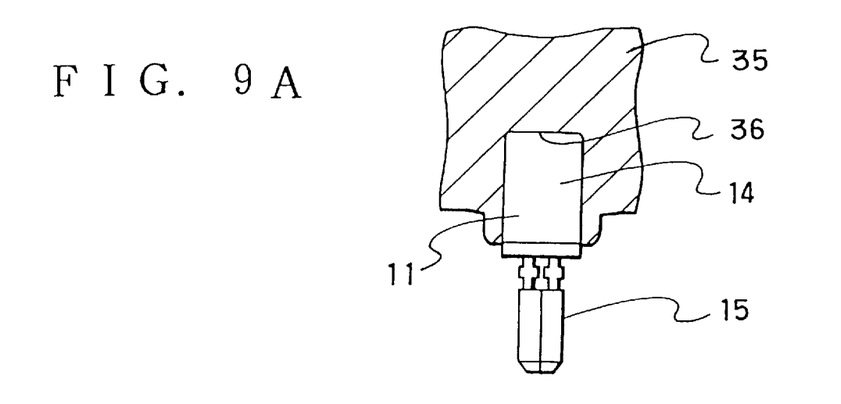
FIGS. 9A, 9B and 9C are schematic sectional views showing first, second and third steps, respectively, of molding the bulb holder part according to the present invention.
Figure 9B:
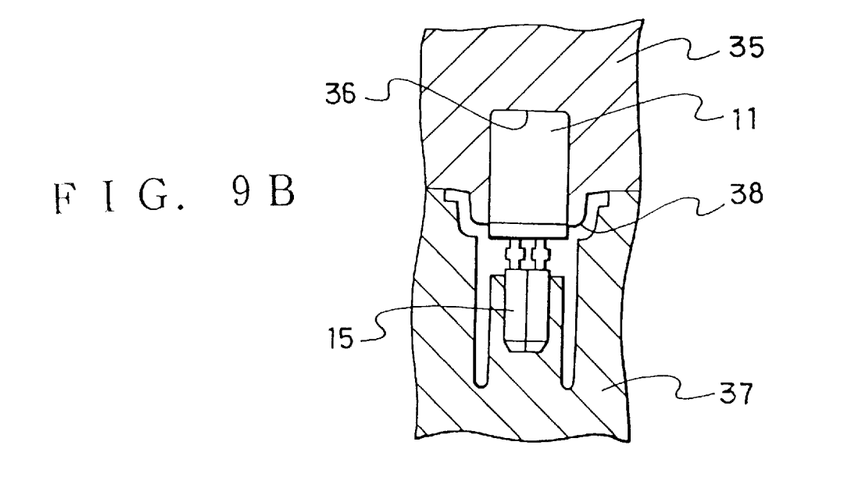
Figure 9C:
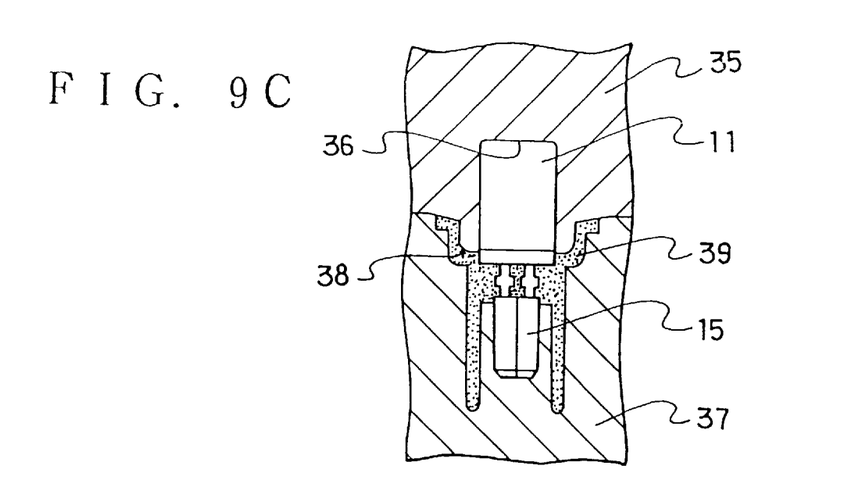
Figure 10A:
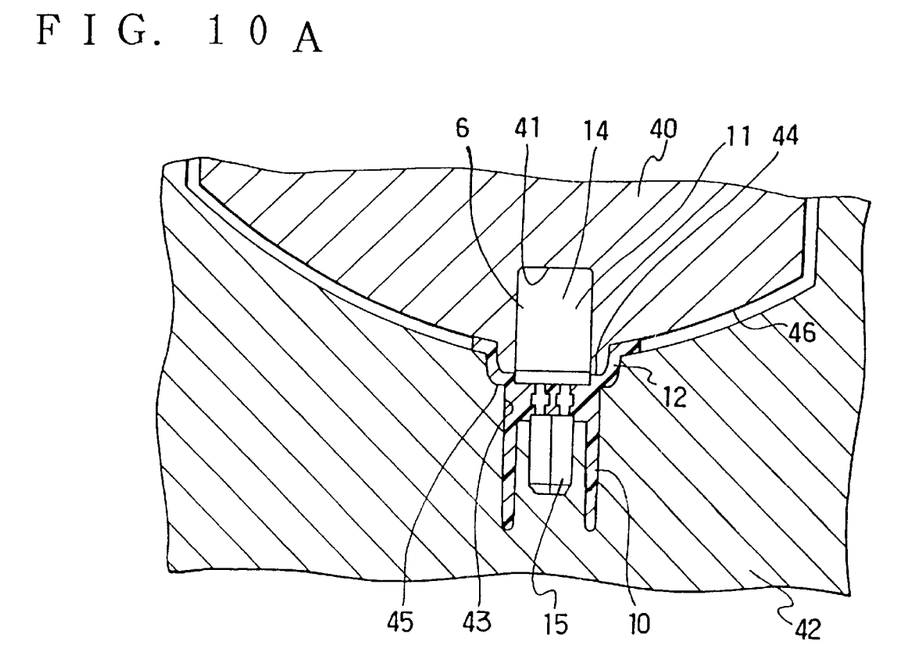
FIGS. 10A and 10B are schematic sectional views showing two steps of molding the lamp body according to the present invention.
Figure 10B:
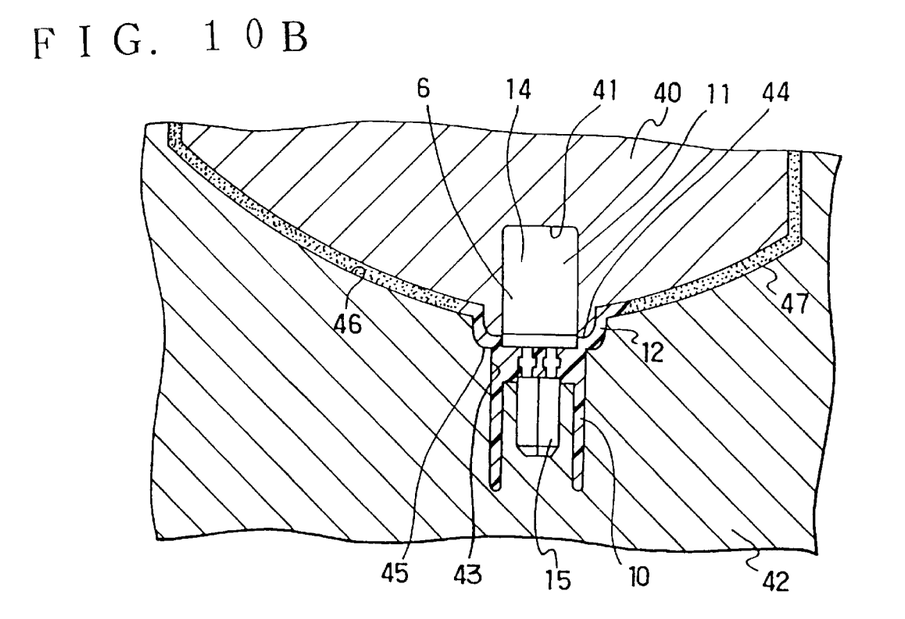

FIGS. 9A, 9B and 9C are schematic sectional views showing first, second and third steps, respectively, of molding the bulb holder part according to the present invention, and FIGS. 10A and 10B are schematic sectional views showing two steps of molding the lamp body according to the present invention.

First, the bulb holder part 6 is previously molded as described below.

That is, the bulb holding sections 14 (merely one section is shown in the figures) of the terminal pieces 11 are fitted into a recessed section 36 formed in a fixed mold die 35 as shown in FIG. 9A, then a movable mold die 37 is joined to the fixed mold die 35 as shown in FIG. 9B, and then a mold resin 39 for molding the cover section 10 is injected into a cavity 38 defined by the fixed mold die 35 and the movable mold die 37 as shown in FIG. 9C. After cooling and solidifying the injected mold resin, the movable mold die 37 is moved to detach from the fixed mold die 35 and, then, the molded bulb holder part 6 is taken out of the movable mold die 37. Thus, the bulb holder part 6 is molded by so-called an insert molding method in which the mold resin is injected into the mold dies under a condition where the terminal pieces 11 are previously inserted.

For the insert molding method as described above, the embedded parts 28 of the terminal pieces 11 are embedded in the base part 12 of the cover section 10. Since the embedded parts 28 are formed with the protrusions 33 the terminal pieces 11 are assuredly secured by the cover section 10, and there is no fear that the terminal pieces 11 are detached from the cover section 10.

Other than the insert mold method as described above, the terminal pieces may be attached to the cover section after the cover section is previously molded.

The material of the mold resin 39 for molding the cover section 10 may be a synthetic resin having a high heat resistivity such as, for example, a nylon resin or PP.

Next, the pre-molded bulb holder part 6 is inserted into a different mold die for molding the outer peripheral part 7 of the lamp body 2. That is, as shown in FIGS. 10A and 10B, the bulb holding sections 14 of the terminal pieces 11 (merely one piece is shown in the figures) are fitted in a recessed section 41 formed in a fixed mold die 40, whereas the cover section 10 is fitted in a recessed section 43 formed in a movable mold die 42. At this time, the bulb holder part 6 is held in the mold dies in such a manner that a front end surface 44 of the base part 12 of the cover section 10 is supported by a peripheral edge part of the recessed section 41 of the fixed mold die 40 whereas an outer peripheral part 45 at a rear surface of the base part 12 is supported by a front edge part of the recessed section 43 of the movable mold die 42. Hence, as shown in FIG. 10A, a cavity 46 for molding the outer peripheral part 7 is defined by the two mold dies 40, 42 and the side surface of the base part 12 of the cover section 10 of the bulb holder part 6.

Next, a mold resin 47 for molding the outer peripheral part 7 is injected into the cavity 46 as shown in FIG. 10B. A material of the mold resin 47 may be a synthetic resin material the cost of which is relatively small because the outer peripheral part 7 is not required to have the so high heat resistivity. For example, a recycled material such as the mixtured material of ABS and PC, an AAS material having weather resistivity, or a PP material may be selected as the material of the outer peripheral part 7.

Due to heat of the molten mold resin 47, the part of the cover section 10 of the bulb holder part 6 facing the cavity 46 is partly fused and therefore fuse-bonded to the mold resin 47. Accordingly, after cooling and solidifying, the outer peripheral part 7 and the bulb holder part 6 are integrated with each other. When the mold dies open, the molded lamp body 2 is taken out of the movable mold die 42.

According to the automotive signal lamp 1 according to the present invention as described above, since the bulb holder part 6 is formed integrally with the lamp body 2, the number of required components can be reduced, the configuration of the lamp body 2 can be simplified, and the structure of the mold apparatus can also be simplified. Therefore, the manufacturing cost for the automotive signal lamp 1 can be decreased. Further, since the configuration of the lamp is simple, the yield rate can be improved which also contribute to reduce the manufacturing cost.

Furthermore, the automotive lamp according to the invention requires no packing member for the water-proof property, which has been needed by the conventional lamp. This also contributes to reduce the manufacturing cost.

Moreover, as described above, only the bulb holder part is formed by a material having a high heat resistivity for prevent the parts surrounding the terminal pieces 11 from deteriorating due to heat. Therefore, this still also contributes to suppress the manufacturing cost.

Still further, as described above, since the automotive signal lamp 1 is molded by the insert molding method in which the bulb holder part 6 is molded while the terminal pieces 11 are inserted in the mold die, the water-resistivity between the terminal pieces 11 and the other parts of the bulb holder part 6 can be improved. Further, there is no fear that the terminal pieces 11 are detached from the cover section 10. Furthermore, because the holes 31 are formed in the embedded parts 28 to reduce the contact area with the mold resin, the sealability at the contact portion can be affirmed to further improve the water-resistivity.

Further, as described above, since the bulb holding sections 14 of the terminal pieces 11 are not surrounded by the cover section 10, the heat is effectively dispersed from the bulb holding sections 14 thereby to suppress the heat deterioration of the bulb holder part 6.

Moreover, because the side surfaces of the bulb holding sections 14 of the terminal pieces 11 are supported by the rib members 34, the bulb holding sections 14 can be stably positioned and, accordingly, the light source position of the light source bulb 5 can be accurately positioned.

According to the embodiment described above, the lamp body 2 is molded by so-called an insert molding method in which the resin is injected while the bulb holder part 6 is inserted in the mold die. However, the two-color molding method may be employed, in which two fixed mold dies are put on a turn-table, the bulb holder part 6 is first molded by closing the respective fixed mold die by the movable die for molding the bulb holding sections while turning the turn-table, and then the different movable mold die for molding the outer peripheral part is closed to mold the outer peripheral part 7.

Figure 11:
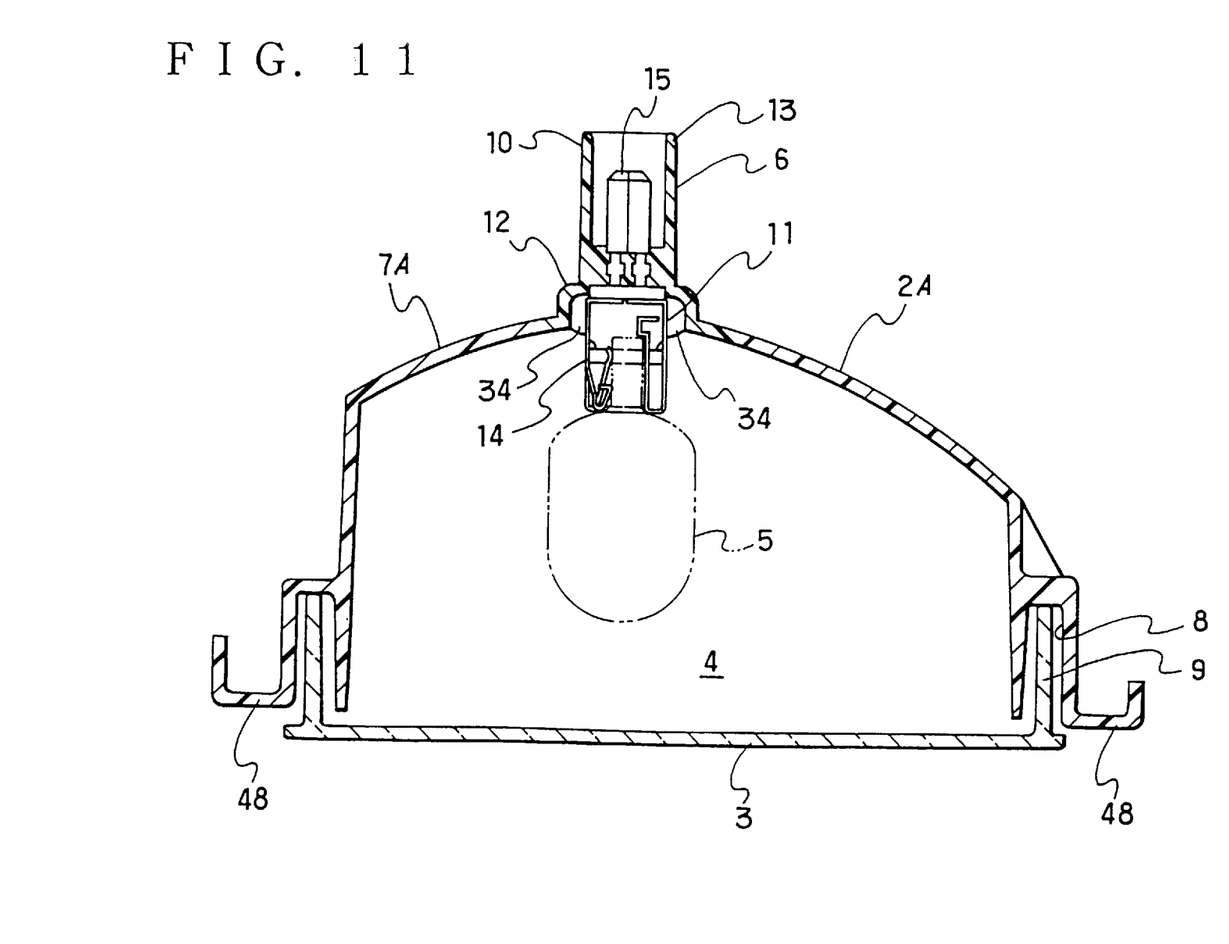
FIG. 11 is a horizontal sectional view showing a modified lamp body of the vehicular lamp according to the present invention.

FIG. 11 is a horizontal sectional view showing a modified lamp body 2A of the vehicular lamp according to the present invention. The lamp body 2A is formed integrally with a rim member 48 projecting outward from the front opening periphery thereof.

In a case where the lamp body 2A has the rim member 48, since the rim member 48 is exposed to the outside and weather-beaten, the material of the outer peripheral part 7A may be selected from a synthetic resin having high weather resistivity such as an AAS material.

As described above, a vehicular lamp according to the present invention is provided with a lamp body formed from a synthetic resin, a front lens coupled to a front opening of the lamp body, and a light source, wherein the lamp body is provided with a bulb holder part for holding the light source bulb, and a cover section of the bulb holder part is molded integrally with an outer peripheral part of the lamp body by different materials from each other.

According to a method of molding a lamp body of the vehicular lamp of the present invention in which the vehicular lamp is molded by a synthetic resin integrally with a cover section of a bulb holder part for holding a light source bulb, a pre-molded bulb holder part having the cover section is inserted in a mold die, and then a resin material is injected into the mold die for molding an outer peripheral part of the lamp body, so that the cover section of the bulb holder part and the outer peripheral part of the lamp body are integrally formed.

According to the present invention, since the bulb holder part is molded integrally with the lamp body, the number of required components can be reduced, the structure can be simplified, no packing member is required and, therefore, the manufacturing cost can be lowered.

Further, because the cover section of the bulb holder part and the outer peripheral part of the lamp body are formed from the different materials from each other, only the cover section of the bulb holder part is formed by a material having a high heat resistivity. Therefore, this also contributes to suppress the manufacturing cost.

It should be understood that the form of the invention herein shown and described is to be taken as a preferred example of the invention and that various changes in the shape, size and arrangement of parts may be resorted to without departing from the spirit of the invention or the scope of the subjoined claims.

What is claimed is:

1. A vehicular lamp comprising:
   a lamp body comprising an outer peripheral part and a bulb holder part comprising terminal pieces and a cover section, said cover section of said bulb holder part being formed from a first synthetic resin material and said outer peripheral part being formed from a second synthetic resin material, said cover section being molded integrally with said outer peripheral part;
   a front lens coupled to a front opening of said lamp body; and
   a light source disposed within a lamp chamber defined by said lamp body and said front lens; and
   wherein said terminal pieces comprise first and second bulb holding sections and a terminal section having an electrical conductivity and a spring resiliency.

2. The vehicular lamp according to claim 1, wherein said cover section of said bulb holder part of said lamp body comprises a base part and a connector casing part, and said casing part is square cylindrical.

3. The vehicular lamp according to claim 1, wherein said first bulb holding section comprises a base part which is box-shaped opening upward, a front end of which opens and a rear end is closed except for an upper end part thereof, a right side wall which is continuously formed with a pressing piece at a front end thereof and a left side wall which is continuously formed with an engaging piece and a contact piece at a front end thereof, and said second bulb holding section comprises a base part which is box-shaped opening downward, a front end which opens and a rear end which is closed except for a lower end part thereof, a side wall which is continuously formed with the pressing piece at a front end thereof and a right side wall which is continuously formed with the engaging piece and a contact piece at a front end thereof.

4. The vehicular lamp according to claim 3, wherein said pressing piece comprises a front end part extending sideward from the front end of the right side wall, a restricting part extending rearward from the side end of the front end part, the length of the restricting part is substantially two-third of the base part, a stopper part protruding slightly sideward from the rear end of the restricting part, and a position-fixing part extending slightly rearward from the side end of the stopper section, bending perpendicular to extend sideward and contacting a tip end thereof with a side wall.

5. The vehicular lamp according to claim 4, wherein said front end part extends sideward from a part of the right side wall except for the vertical end part and the one-third part thereof, and a vertical edge is gradually bent vertically, so that a vertical width of which is substantially less than a half of a vertical width of the right side wall at a lateral end thereof, and vertical widths of the other parts than the front end part of said pressing piece is substantially the same as the vertical width of the front end part at the left end thereof, and they are located to face substantially the lower half of the right side wall.

6. The vehicular lamp according to claim 5, wherein said engaging piece is formed of substantially the half portion of the side wall of said base part.

7. The vehicular lamp according to claim 6, wherein a front side part of the substantially the half portion of the side wall is separated by a slit from the other half portion at substantially a center position in the front-rear direction thereof, and said engaging piece extends slightly rightward from substantially the center position of the front side part and then bent to extend straight frontward.

8. The vehicular lamp according to claim 7, wherein said engaging piece is formed integrally with a front end part extending sideward from the front end of the front side part and then curving rearward, an engaging part extending slightly side-rearward from the lateral end from the front end part, and a rear end part of said engaging part is sharply bent sideward.

9. The vehicular lamp according to claim 8, wherein said contact piece comprises a front end part extending sideward from the half portion of the side wall of the base part and then bending rearward, and a resilient part extending slightly side-rearward from the side end of the front end part, a rear end part of the resilient part is curved sideward to perform as a contact part.

10. The vehicular lamp according to claim 9, wherein said contact part of the contact piece is disposed at a position slightly in front of the stopper part of the pressing piece, the engaging part of the engaging piece is disposed at a side position from a position of the resilient part of the contact piece in the front-rear direction, and a part of the sidemost end of the rear end of the engaging part is disposed at a slightly side position of the side end of the contact part of the contact piece.

11. The vehicular lamp according to claim 10, wherein one wall of the base part comprises a front part separated by slits from the side wall at slightly a rear position of the center in the front-rear direction thereof, and the separated portion projects vertically to act as an elastic piece.

12. The vehicular lamp according to claim 1, wherein said bulb holding section comprises an embedded part projecting rearward from a vertical edge of the rear wall of the base part, and the terminal section extends rearward from a rear end of the embedded part.

13. The vehicular lamp according to claim 12, wherein said embedded part has a lateral width which is equal to that of the rear wall, and the embedded part comprises a base part which is a plate-like member having a small vertical width and an anchor part projecting rearward from the center of the base part, the anchor part has a lateral width which is substantially a half of the base part, the anchor part is divided into a couple of elements 32 by a hole formed in the center thereof, and each of the divided elements is formed with a couple of protrusions protruding therefrom in the left and right directions thereof.

14. The vehicular lamp according to claim 1, wherein said terminal section is formed by cutting out a metal plate having a width of substantially twice as wide as the terminal section and folding a left and right pieces over a surface thereof, so that a thickness of the terminal section is twice as thick as the row metal plate.

15. The vehicular lamp according to claim 14, wherein said terminal pieces are integrally molded with said cover section in such a manner that the embedded parts of the terminal pieces are embedded in the base part of the cover section under a condition where the openings of the base parts of the bulb holding sections face each other, and the bulb holding sections protrude frontward from the front surface of the base part while the terminal sections are disposed within the connector casing part.

16. The vehicular lamp according to claim 15, further comprising a plurality of rib members projecting from the front surface of the base part of the cover section, and the rib members contacting to both outer surfaces of the upper wall and outer surfaces of the outer and side walls of the lower wall of the bulb holding sections of the terminal pieces.

17. The vehicular lamp according to claim 16, wherein a base part of the light source bulb of the wedge-base type is inserted in the bulb holding sections of the terminal pieces from the front thereof, the vertical position of the light source bulb, the base part of which is inserted in the bulb holding sections, is restricted by resiliently contacting the upper and lower side surfaces of the base part with the elastic pieces of the terminal pieces, and the side surface of the base part comes into abutment against the restricting parts of the pressing pieces of the terminal pieces, a rear end of the base part comes into abutment against the stopper parts of the pressing pieces, an engaging protrusion formed on the base part engages with the engaging parts of the engaging pieces, and the contact parts of the contact pieces of the light source bulb contact elastically with an external lead wires disposed along the side surface of the base part.

18. The vehicular lamp according to claim 1, wherein said first synthetic resin material is a synthetic resin having a high heat resistivity.

19. The vehicular lamp according to claim 18, wherein said first synthetic resin material is selected from a group consisting of a nylon resin or PP.

20. The vehicular lamp according to claim 1, wherein said second synthetic resin material for said outer peripheral part is selected from a group consisting of a recycled material, an AAS material and a PP material.

21. The vehicular lamp according to claim 20, wherein said recycled material comprises mixtured material of ABS and PC.

22. The vehicular lamp according to claim 1, wherein said outer peripheral part comprises a mounting groove disposed at an opening periphery thereof and said front lens comprises a mounting leg projecting rearward from a peripheral edge part thereof, said mounting leg of said front lens is fitted in the mounting groove of said outer peripheral part of said lamp body.

* * * * *